D. H. SHAPIRO.
GARMENT FORM.
APPLICATION FILED APR. 13, 1916.
Reissued Nov. 9, 1920. 14,981.
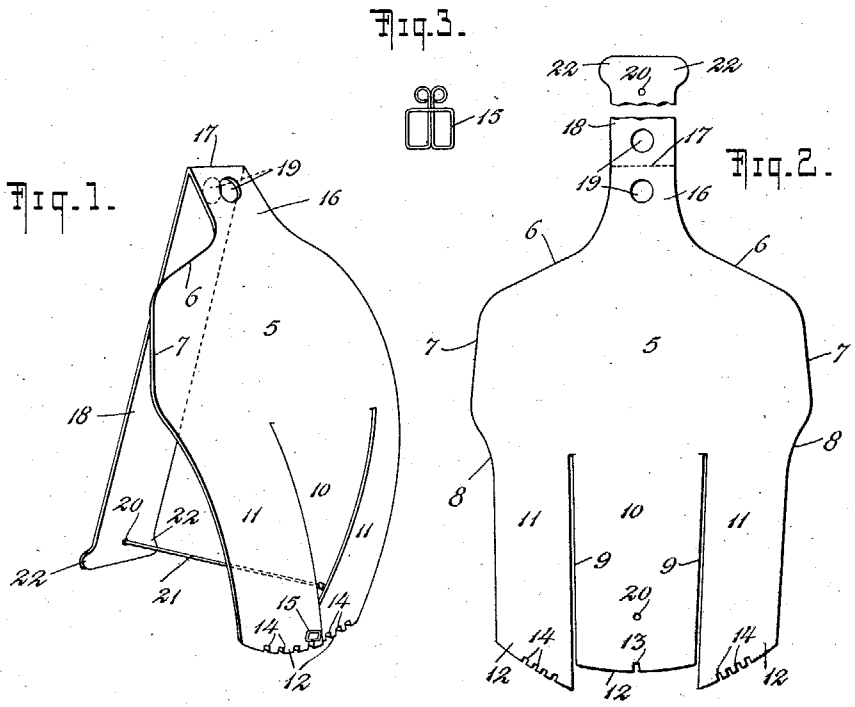
WITNESSES:
George Du Bon
Henry Ruhl
INVENTOR
DAVID H. SHAPIRO
BY
Briesen & Schurek
ATTORNEYS

UNITED STATES PATENT OFFICE.

DAVID H. SHAPIRO, OF MONTREAL, QUEBEC, CANADA.

GARMENT-FORM.

14,981. Specification of Reissued Letters Patent. Reissued Nov. 9, 1920.

Original No. 1,140,407, dated May 25, 1915, Serial No. 836,364, filed May 4, 1914. Application for reissue filed April 13, 1916. Serial No. 90,988.

*To all whom it may concern:*

Be it known that I, DAVID H. SHAPIRO, a citizen of the Dominion of Canada, and resident of the city of Montreal, in the Province of Quebec and Dominion of Canada, have invented certain new and useful Improvements in Garment-Forms, of which the following is a full, clear, and exact description.

This invention relates to improvements in garment forms, and the main object of the invention is to provide an inexpensive device that can be used by manufacturers for packing garments in boxes to prevent crushing or creasing of the garment material, or which can be used for suspending the garment, or displaying same to best advantage in such a manner that the garment will resemble approximately the natural curvature of the human form.

A further object is to provide a garment form which may be stored in flat condition and assembled into operative form in a moment of time.

A still further object is to provide a garment form which may be adjusted in accordance with the size of the garment to be displayed thereon.

Another object is to provide a form which may be hung or stood on a counter or like surface with equal facility.

To accomplish the above objects, I provide a flat card shaped approximately like the human body following the lines of the shoulders, but extremely wide at the waist. The width of the card at this point in the embodiment shown in the drawings is such that it is not until there is an overlapping of inner integral portions of the two outer tongues that the proper dimensions for the waist line are produced. These two outer tongues, as shown, extend in their flat position below the normal waist line.

The lower part of the card or sheet is slit into three tongues, the outer two of which are drawn over the central one in the general direction of their own planes to impart a curvature to the card resembling the curvature of the human form. In the preferred embodiment of the invention the shortened outer tongues are drawn together until certain integral portions thereof overlap. These outer tongues are secured in their abnormal position into which they are forced by being drawn together by any suitable means so as to maintain the tongues in proper position after the cards have become curved. The neck portion consists of a long strip folded or hinged a short distance above the body, so that the strip may be used either as a hanger for suspending the form or a support for standing the same on a counter or the like.

In the drawings which illustrate the invention: Figure 1 is a perspective view of the form assembled in standing position. Fig. 2 is a plan view of the blank. Fig. 3 is a plan view of the fastening means.

Referring more particularly to the drawings, 5 designates a flat sheet of suitable material such as card-board having suitably sloped shoulder edges 6 and side edges 7 diverging downwardly from the shoulders for a short distance, so as to enter the arm holes of a garment placed thereon, and then curving toward the center, as shown at 8. The lower part of the card representing the waist line is much wider than the ordinary waist measure. The lower part of the card is provided with two or more slits 9 extending from the lower edge approximately half way to the upper edges and arranged parallel or slightly diverging at the top, as shown. These slits divide the lower part of the card into a central tongue 10 and side tongues 11, the lower edges 12 of which are so formed that when the lower ends of the side tongues are drawn toward the center line and overlapped, the three bottom edges will coincide in a single straight or slightly curved line, as clearly shown in Fig. 1. The center of the lower edge of the tongue 10 is provided with a single notch 13, while the lower edges of each of the side tongues 11 are provided with a plurality of notches 14, so arranged that when the tongues are brought into overlapping relation, corresponding notches of the side tongues will coincide exactly with the notch of the center tongue, and permit the insertion of a fastener 15, which is preferably one of the well known forms of paper clip, shown in Fig. 3.

A neck portion 16 is provided in the usual location, but is very much elongated, so that when folded or hinged at the line 17, a support 18 is provided behind the form, which will hold the same in upright position on a store counter or the like. This neck portion is provided with holes 19 arranged equidistantly on opposite sides of the fold 17, so that the neck portion may be folded closely upon itself, bringing the holes 19 into register with one another and permitting the form to be suspended. To prevent the support 18 sliding back away from the body portion, and allowing the form to fall from its upright position, holes 20 may be provided in the lower portion of the center tongue 10 and the extremity of the support 18, through which a cord or the like 21 may be passed and secured by knotting at the ends. To impart additional stability and prevent the form falling in a lateral direction, the extremity of the support may be widened, as shown at 22.

The forms are shaped and stored in flat condition preferably with the supports 18 folded under the body portion. To erect the device in operative form, the side tongues 11 are drawn together at their lower ends in a general direction of their own planes and preferably above the central tongue 10. In the preferred embodiment of the invention shown in the drawings, the outer tongues are thus drawn together until two corresponding notches 14 of the respective tongues register with each other, whereupon a fastener 15 is inserted in the registering notches 14 to prevent lateral displacement of the two outer tongues, whereby said tongues are maintained in the position selected for them. The fastener may also be simultaneously inserted in the notch 13 of the central tongue, said notch 13 being shown as centrally located upon the central tongue so that when two of the notches 14 of the outside tongues 11 are in central register, they will also register with the notch 13. The bending of the card which results gives the central portion thereof a bulging or slightly conical form, which closely resembles the curvature of the human bust. By selecting various notches 14, the degree of this curvature may be regulated according to the size or proportion of the garment, which it is desired to display. If the garment is to be suspended for display or storage or laid flat in a box or the like, the support portion 18 remains folded under the body portion, but if it is desired to stand the garment on a show case or in a window for display purposes, the tongue is extended to the rear and may, if desired, be connected with the body portion by the cord 21. The form will then stand on the united lower edges of the three tongues and the widened extremity of the support 18. While the device may be used as a display form with the tongue, probably its most general use will be as a method of packing garments in their shipping boxes. The garment is held against sliding around in the box and is also held to the natural curvature of the body, so that the appearance presented is much superior to that of a garment lying flat in the box. In addition the form will be of great service to the purchaser as it will constitute a hanger for the garment. When used as a hanger the curvature of the form holds the garment to its natural position, so that sagging and wrinkling is entirely prevented.

While the device has been shown in its simplest form, that is, with three tongues, it is obvious that the number of these may be multiplied and the slits extended varying distances upwardly, so that a more perfect representation of the human form can be obtained. It is also obvious that the notches 13 and 14 may be replaced by apertures or other suitable edge configuration to render the parts capable of employment as a fastening element, and the specific form of clip shown replaced by any other suitable form of fastening means, without departing from the spirit of the invention.

Having thus described my invention, what I claim is:

1. A garment form comprising a flat sheet shaped at its upper portion to represent garment shoulders, and having a lower portion thereof divided into three tongues and adjustable means for varying the lateral curvature of the form comprising a series of open ended notches cut in the lower edge of the tongues, the outer tongues being adapted to overlap each other over the central tongue and a detachable fastening device inserted in the registering notches of the three tongues when in overlapped position.

2. A garment form comprising a sheet shaped at its upper portion to represent garment shoulders and having its lower portion divided into three tongues, the outer tongues being provided with recesses, and means on the central tongue adapted to cooperate with said recesses for securing the outer tongues in overlapped position over each other and jointly over the central tongue.

3. A garment form comprising a sheet of flexible material shaped at its upper portion to represent garment shoulders and having its lower portion divided into three tongues, fastening means for securing and maintaining the two outer tongues in a position in which an integral portion of one overlaps an integral portion of the other, said overlapping parts jointly located over the central tongue, said fastening means including an irregular edge configuration on each of said two outer tongues to form one element of the means by which said tongue is secured and maintained in said overlapping position.

In testimony whereof I have hereunto set my hand.

DAVID H. SHAPIRO.